United States Patent Office 3,248,859
Patented May 3, 1966

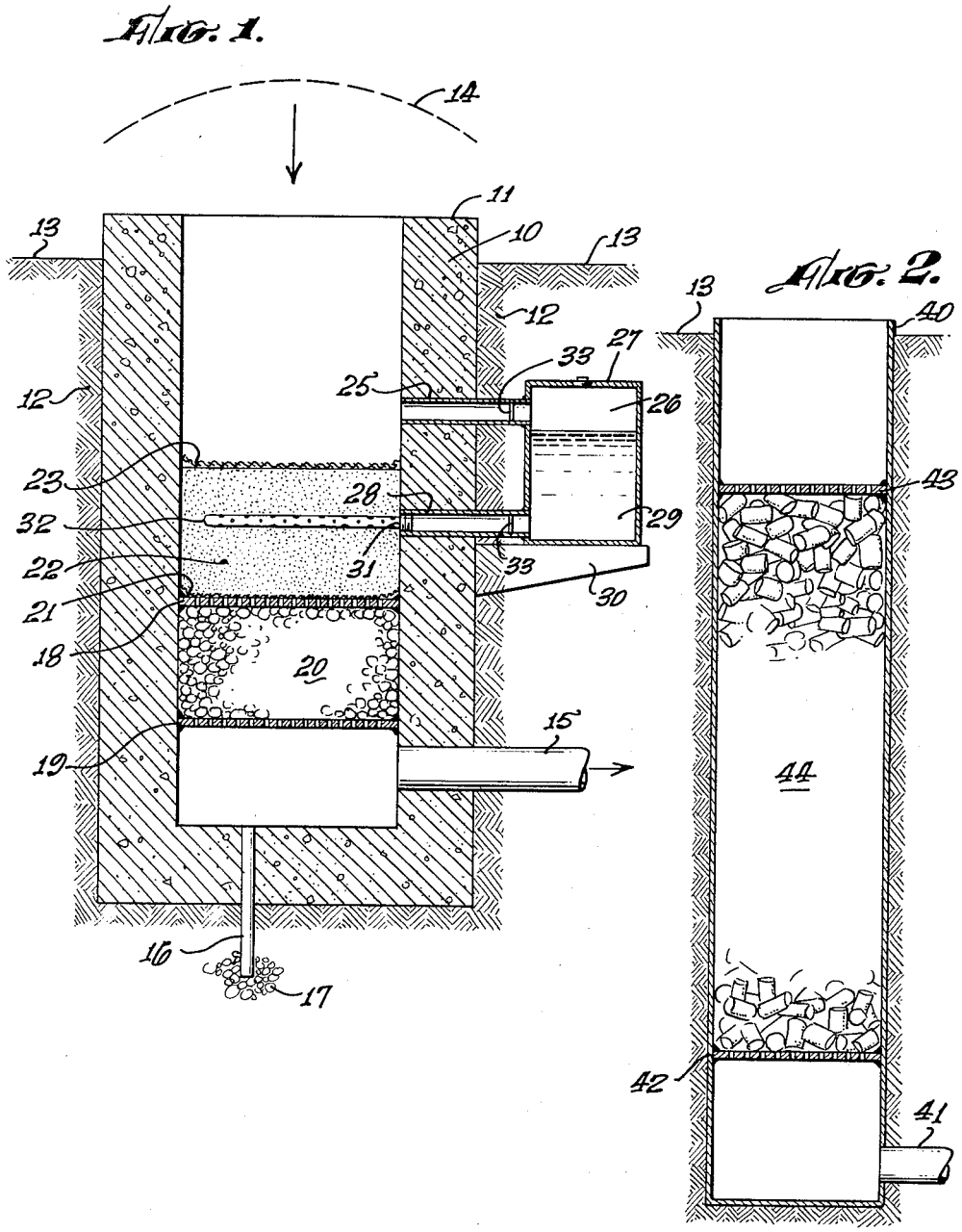

3,248,859
BLAST RESISTANT FILTER AND CLOSURE VALVE
John M. Stephenson, 550 Yucca, and Robert S. Chapler, 669 E. Howell Road, both of Oxnard, Calif.
Filed Mar. 5, 1963, Ser. No. 263,083
2 Claims. (Cl. 55—233)

The invention described herein may be manufactured and used by or for the Government of the United States of America for governmental purposes without the payment of any royalties thereon or therefor.

This invention relates generally to the ventilation of underground protective shelters for use in the vicinity of possible nuclear bomb attacks and specifically to a blast resistant filter and closure valve which serves as a particulate and radioactive fallout filter and as a pressure reducer or valve responsive to the pressure wave accompanying and engendered by the bomb blast.

One of the most important considerations in the design of underground shelters for the protection of personnel and vital instrumentation from the effects of nuclear explosions in adequate ventilation. The first problem to be solved is that of protection against the forces of the explosions as evidenced by both positive and negative pressure waves in the atmosphere. A second and practically equally important problem is found in the filtration of the incoming pressurized air and the consequent removal of radioactive fallout as well as eliminating or minimizing any accompanying thermal radiation effect.

Many types of blast actuated valves have been proposed, most of which are fairly complex in operation. Various types of filters have been designed, including deep layers of sand. While these deep layers or masses of sand have proven effective for filtration, the pressure drop therethrough interfered too much with normal ventilation. Such previous installations also were expensive, required involved preparation, and considerable installation time. Experimentation, study, and observations of actual test equipment have demonstrated the urgent need for a blast resistant filter and closure valve which was not only relatively inexpensive but could be easily and quickly installed with a minimum of parts where required.

The principal object of our invention, therefore, is to provide a blast resistant filter and valve closure which would obviate the disadvantages of previously designed equipment and which would possess the advantages set forth above.

Another object of our invention is to provide a blast resistant filter and closure valve that would be efficiently operable through any length of blast duration or any degree of pressurization thereby induced.

A further object of our invention is to provide an effective means for closing off the ventilation duct from the effects of an atmospheric pressure wave and then automatically opening the duct on the reduction of the pressure to allow adequate ventilation.

A still further object of our invention is to provide, in conjunction with proper filtering action, a valve-like closure means operable automatically to prevent the escape of air from the underground shelter in the event of an atmospheric negative pressure wave.

Another object of our invention is to provide a blast resistant filter and closure valve which would be operable to reduce, if not eliminate, any thermal radiation effects accompanying the pressure waves engendered by the nuclear explosion.

Other objects, advantages and novel features of the invention will become apparent from the following detailed description of the invention when considered in conjunction with the accompanying drawings wherein:

FIGURE 1 is a cross-sectional elevation of one form of our blast resistant filter and closure valve; and FIG. 2 is a cross-sectional elevation of a modified form of our invention.

With reference to FIG. 1, ventilation duct 10 may be formed of reinforced concrete, either separately or in situ, and is shown in place in the ground 12. While the duct may be of any cross-sectional configuration desired, it should be emplaced or cast in place with its upper edge 11 located slightly above ground level 13 so as to prevent surface sand or other surface debris blowing into or otherwise entering the duct proper. Where necessary, a dome shaped metallic cover 14 having large perforations may be provided for preventing large debris falling into or animals from entering the upper portion of the duct. This cover also might well perform a very useful function in deflecting thermal radiation when the bomb blast occurs close to the underground shelter.

The large duct 10 is conected with the underground shelter, not shown, by means of a small duct 15 which may be constructed of any suitable material. A small vertical drainage duct 16 is provided in the bottom of the main duct for draining the main duct of water or other liquids into a provided gravel or rock sump 17.

Situated above the opening of duct 15 into the main duct 10 are two perforated metal plates 18 and 19. These plates may be separated, as a practical example, by approximately 12 inches. After plate 19 is secured in place by any suitable means, a 12 inch layer of resilient material 20 is placed on top of this plate. This resilient material may be in the form of rubber or deformable plastic balls, chunks of porous or formaminous resilient materials or a cast-in-place section of porous polyurethane or other suitable foraminous material. Plate 18 is then secured in place on top of this layer 20 of resilient material.

A sheet of hardware cloth 21, or other suitable screening material or apertured plates of a mesh small enough to keep the available sand or other mineral aggregate from passing through, is then placed on top of plate 18. A layer of sand 22 is then laid, say to a depth of 12 inches, above the hardware cloth 21. Another similar sheet of hardware cloth 23 or apertured material may then be secured on top of the sand layer 22 so as to prevent its displacement by wind or other means.

Leading from the upper portion of the main duct above the upper hardware sheet 23 is a small air duct 25. This small duct leads into the upper air chamber 26 or a small water tank 27 which is supported on a pair of brackets 30 suitably secured to the external wall of the main duct. Also leading from the main duct is another small duct 28 which leads into the lower water chamber 29 of the tank 27. This small duct terminates, internally of the main duct, in a threaded plug 31 which plug carries a perforated smaller pipe 32. This perforated pipe is inserted in about the middle portion of the sand layer 22 near the tank end of each of the small ducts 25 and 28, a frangible disc 33 is emplaced. These fragible discs which may be of thin metal, plastic or other suitable easily ruptured material are employed to prevent the evaporation and escape of the water or other absorbent liquid from the tank until the need for such liquid arises.

In the operation of this embodiment of our invention, as the pressure wave from the blast passes the perforated cover 14 and descends downwardly into the duct, part of it enters the small duct 25 and ruptures the fangible disc 33 associated therewith. As the pressure builds up in the tank air chamber 26, the frangible disc 33 in small duct 28 is ruptured and the tank water flows through perforated pipe 32 into the sand layer 22. There the liquid serves not only to compact the sand but, by wetting it, to reduce the thermal radiation effects accompanying the pressure wave from the blast. As the pressure wave continues downwardly, it reaches and compacts the resilient material 20 which further greatly reduces the pressure. Depending upon the type of resilient material used, the pressure wave may be completely denied further ingress at this point. Thus, if non-porous hollow rubber or deformable plastic balls or shapes were used, their compaction would result in an impermeable barrier so long as the pressure wave continued. On the cessation of the pressure wave, the resilient material would expand to normal size to allow air to flow freely therethrough.

Where time is of the essence in the construction of such underground shelters and the provision for the ventilation thereof, a simplified version of our blast resistant filter and closure valve could be formed as shown in FIG. 2. There a main duct 40 of metal pipe or other suitable conduit could be vertically installed nearby the underground shelter, not shown. A small horizontal duct 41 would lead from the main duct into the shelter. Interposed between the connection point of duct 41 and the upper end of the main duct adjacent ground surface 13, two perforated metal plates 42 and 43 would be secured to the inner walls of the duct 40. The space intervening between these plates, which space would have a length of ½ to ⅔ of the total length of the main duct 40, would be filled with a quantity of compactible resilient material 44 comprising either shapes of porous and foraminous resilient material such as polyurethane or other suitable open-cell, foam-like material or hollow rubber or deformable plastic shapes capable of being flattened and then expandable to their former shape. Thus, under normal conditions, the mass of resilient material would offer little resistance to the flow of air but would still perform a filtering function. Upon the introduction of the pressure wave, however, the resilient material would be compacted to either greatly reduce the increased pressure or to eliminate it entirely, depending upon the type of resilient material employed. With such compaction, the filtering action would be greatly enhanced. Upon the cessation of the pressure wave, the resilient material would expand to allow air to flow freely therethrough.

Having thus described our invention in a preferred form and in an important modification thereof, we claim:

1. A blast resistant filter and closure valve for the ventilation system of underground shelters protective against the pressure waves and thermal radiation of nuclear explosions comprising, in combination:

a main ventilation duct sunk vertically into the ground adjacent to said shelter, the upper end of said duct being open to atmosphere;

a smaller duct leading from the lower end of said main duct to said shelter;

at least three substantially horizontal perforated metal plates spacedly secured from each other in the interior of said main duct;

a quantity of mineral aggregate suspended between a top and middle one of said plates;

means for introducing a thermal radiation absorbing liquid into said quantity of mineral aggrgate;

said means for introducing a thermal radiation absorbing liquid into said quantity of integral aggregate including:

a tank for the liquid mounted externally on said main duct well under the ground surface adjacent the open upper end of said duct;

a first small duct leading from the upper portion of said main duct into the upper portion of said tank;

a quantity of thermal radiation absorbent liquid in said tank sufficient to maintain the upper level of said liquid below the entrance point of said first small duct into said tank;

a second small duct leading from the bottom portion of said tank into said main ventilation duct, said second duct terminating in a perforateed pipe inserted centrally in said quantity of mineral aggregate; and frangible discs inserted in said first and second small ducts for normally retaining said liquid in said tank prior to the incidence of the pressure wave and thermal radiation from the nuclear explosion; and a quantity of compactible resilient material suspended between a bottom and said middle one of said plates.

2. A filter for protecting a shelter from thermal radiation of a nuclear explosion comprising:

a main ventilation duct adapted to communicate the shelter with the atmosphere;

a pair of perforated plates mounted in said main duct in a spaced relationship with respect to one another along said duct;

a quantity of mineral aggregate disposed in said main duct between said plates;

a tank mounted adjacent the main duct and adapted to contain a predetermined quantity of thermal radiation absorbing liquid;

a first small duct leading from an upper portion of said tank into said main duct;

a second small duct leading from a bottom portion of said tank into said main duct;

a perforated pipe connected to said second small duct and extending into said quantity of mineral aggregate; and frangible disc means mounted in at least said second small duct for retaining liquid in said tank prior to incidence of a nuclear pressure wave for releasing said liquid upon the incidence of such a pressure wave.

References Cited by the Examiner

UNITED STATES PATENTS

| | | | |
|---|---|---|---|
| 680,330 | 8/1901 | Jacobson | 55—486 |
| 2,095,460 | 10/1937 | Swords | 55—515 |
| 2,409,278 | 10/1946 | Hedges | 55—488 |
| 2,920,717 | 1/1960 | Tuttle et al. | 55—475 |

FOREIGN PATENTS 210,059     9/1940     Switzerland.

HARRY B. THORNTON, *Primary Examiner.*